United States Patent [19]

Wilwerding

[11] 4,078,172
[45] Mar. 7, 1978

[54] CONTINUOUS AUTOMATIC FOCUS SYSTEM

[75] Inventor: Dennis J. Wilwerding, Littleton, Colo.

[73] Assignee: Honeywell Inc., Minneapolis, Minn.

[21] Appl. No.: 743,189

[22] Filed: Nov. 19, 1976

[51] Int. Cl.² .................................................. G01J 1/20
[52] U.S. Cl. .................................. 250/201; 250/204; 354/25
[58] Field of Search ............... 250/201, 204, 208, 209, 250/578; 354/25; 356/1, 4, 5

[56] References Cited
U.S. PATENT DOCUMENTS

| 3,781,110 | 12/1973 | Leitz et al. | 250/201 |
| 3,958,117 | 5/1976 | Stauffer | 354/25 |
| 4,031,383 | 6/1977 | Hosoe et al. | 250/204 |

*Primary Examiner*—David C. Nelms
*Attorney, Agent, or Firm*—Henry L. Hanson; Charles J. Ungemach

[57] ABSTRACT

An automatic continuous focus system of the spatial image correlation type determines whether focus correction is needed and in what direction and moves a lens in accordance with these determinations.

16 Claims, 9 Drawing Figures

CONTINUOUS AUTOMATIC FOCUS SYSTEM

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlaton type. Examples of the different forms of arrangements of this type can be found in co-pending U.S. patent applications Ser. No. 627,607, filed Oct. 31, 1975 and Ser. No. 700,963 filed June 29, 1976 by Norman L. Stauffer which are assigned to the same assignee as the present application; in U.S. Pat. Nos. 3,836,772; 3,838,275, and 3,958,117 by Norman L. Stauffer, and in U.S. Pat. No. 3,274,914 by Biedermann et al.

The typical spatial image correlation apparatus includes two auxiliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object to apparatus distance.

The relative movement of the auxiliary optical element and the detector array occurs for each distance measuring or focusing operation. The critical condition occurs when there is best corresponcence between the radiation distributions of the two auxiliary or detection images formed on the two detector arrays. This condition of best distribution correspondence results in a unique value or effect in the processed electrical output signals. Typically, the correlation signal will contain a major extremum (either a peak or a valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object to apparatus distance. The position of the auxiliary optical element at the time of best correspondence is used to control the position of the primary optical element, such as a camera taking lens.

In the previously mentioned co-pending application Ser. No. 700,963 by Norman L. Stauffer, the correlation signal includes a major peak which is indicative of the distance to an object. A peak detector is used to determine this major peak. A complete scan of all focus zones is provided to insure that the highest correlation is achieved. The location of the last and, therefore, highest peak detected corresponds to the desired focus position.

A continuous automatic focus system for movie cameras and the like is disclosed in FIG. 8 of the Stauffer application 700,963. This system uses two RS flip-flops to determine whether focus correction is needed and, if so, in what direction. While this arrangement is generally acceptable, the particular circuit disclosed by Stauffer allows a peak other than the last peak (the correct focus peak) to set the RS flip-flop which determines whether focus correction is needed. When this RS flip-flop is set, no focus correction is allowed. A focus error can occur, therefore, with the system shown in the Stauffer application.

SUMMARY OF THE INVENTION

The system of the present invention is a continuous automatic focus system which overcomes the shortcomings of the prior art systems. The system includes range sensing means, deadband means, focus correction required means, focus correction direction means, and focus control means.

The range sensing means provides an output signal having first and second states. The last transition of the output signal from the first to the second state is indicative of the position of proper focus.

The deadband means provides a deadband period which is determined by the position of the lens. The occurrence of the last transition of the output signal from the first to the second state during the deadband period indicates that the lens is within a zone of acceptable focus and no focus correction is required.

In order to prevent focus error of the type previously discussed, the determination that the last transition occurred in the deadband period cannot be made during the deadband period. It is necessary to determine whether any transitions occurred following the deadband period.

In the present invention, the focus correction required means provides a focus correction required signal if the last time the output signal had the first state was either before or after the deadband period. The focus correction direction means provides a focus correction signal which depends on whether the last output signal first state occurred before or after the deadband period. The focus control means controls the positioning of the lens as a function of these two signals.

DETAILED DESCRIPTION OF THE PREFERRED EMBODIMENTS

Image Correlation Range Sensing Means

Figure 1:
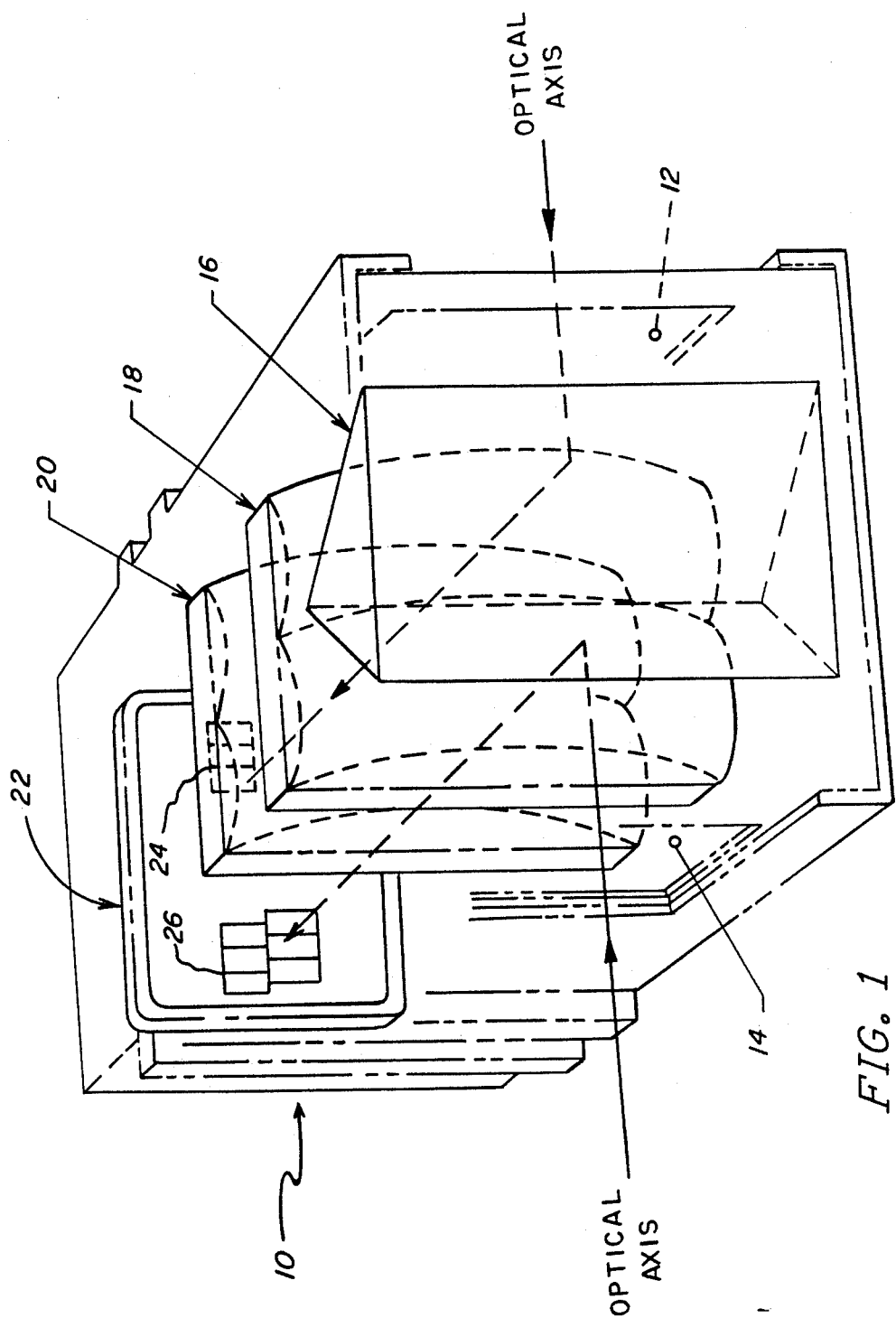
FIG. 1 shows a spatial image correlation range sensing module which may be used in conjunction with the continuous automatic focus system of the present invention.

FIG. 1 shows one particularly advantageous form of image correlation range sensing means which may be used in the continuous automatic focus system. A more detailed description of this modular form of range sensing means may be found in the co-pending application by Norman L. Stauffer, Ser. No. 627,607.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require not adjustment or alignment.

Figure 2:
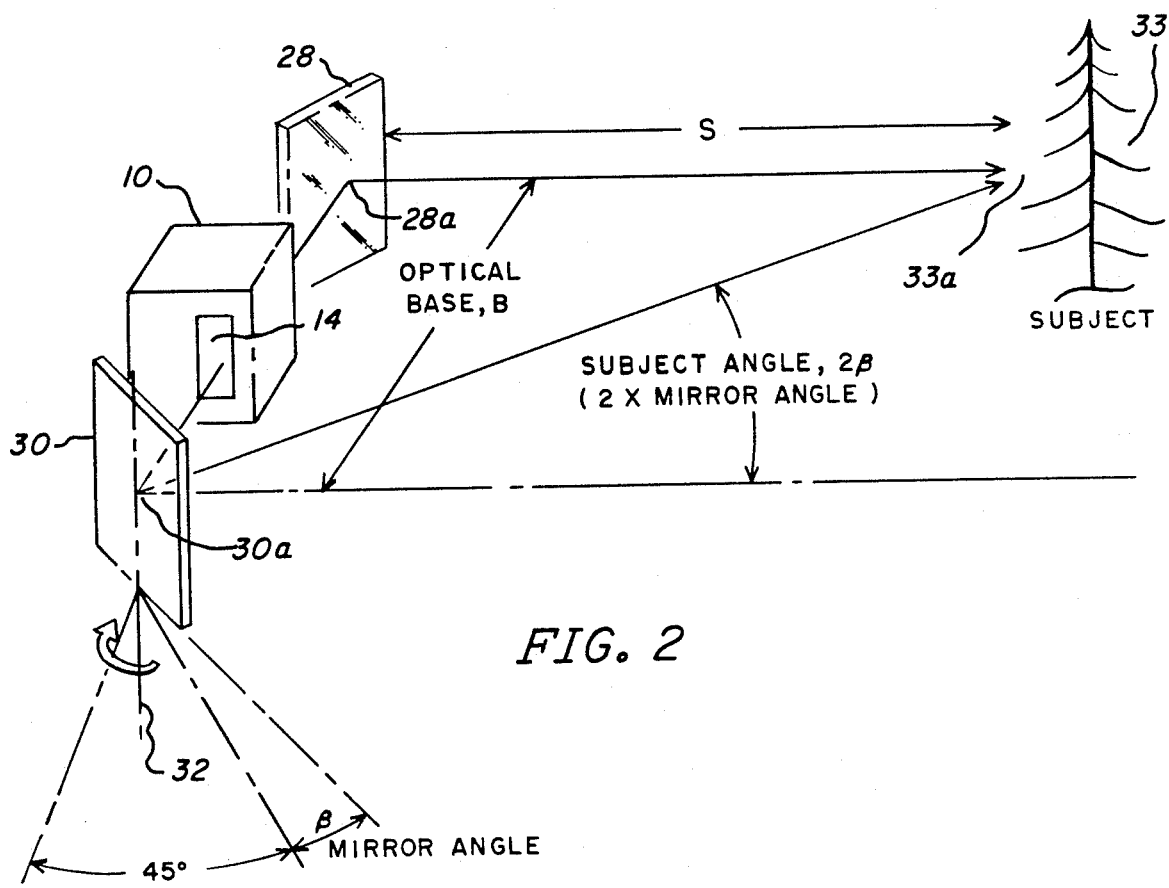
FIG. 2 shows the basic optical configuration of a system using the module of FIG. 1.

To use module 10, two mirrors, 28 and 30, must be positioned so as to direct light from the subject into the two viewing ports. Such a basic system is illustrated in FIG. 2. Mirror 28 provides a fixed view of the portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle $2\beta$ fulfills the conditions $$\tan(2\beta) = B/S,$$

wherein B is the angle through which mirror 30 is rotated from a 45° position where light from infinity is reflected into viewing port 14. As seen in FIG. 2, angle $2\beta$ is also the angle between a line drawn from point 33a on subject 33 and 30a on mirror 30, and line drawn from point 33a subject 33 and point 28a on mirror 28. B is the length of the base from point 28a on mirror 28 to point 30a on mirror 30, and S is the distance between point 33a on subject 33 and point 28a on mirror 28. This identity is recognized by the correlation electronics of integrated circuit 22 as a major extremum (preferably a peak) in the correlation signal.

Figure 3:
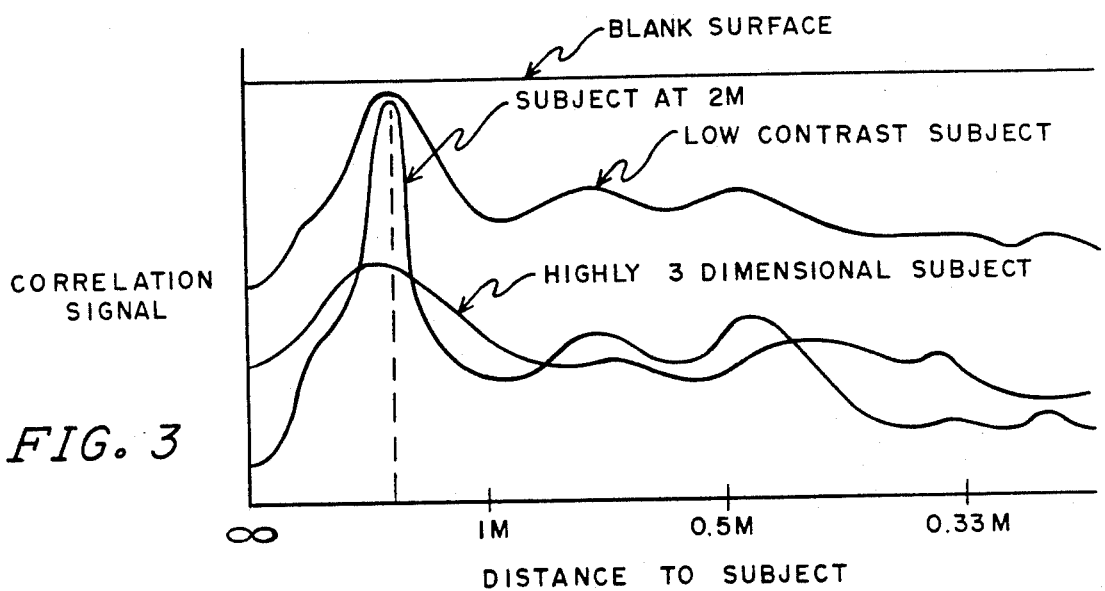
FIG. 3 shows the correlation signal as a function of distance to the subject for several different conditions.

FIG. 3 illustrates the correlation signal as a function of distance to the subject. In FIG. 3, a subject a approximately 2 meters distance from the optical system produces a peak output corresponding to that distance, as shown by the curve labelled "Subject at 2M." At the infinity position mirrors 28 and 30 are each at 45°, thus directing the optical axis from each into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out-of-correlation conditions. A highly three-dimensional subject may not produce as high a peak signal as that produced by a strictly two-dimensional flat scene.

CONTINUOUS AUTOMATIC FOCUS SYSTEMS

The present invention is a continuous automatic focus system which is used in conjunction with spatial image correlation range sensing means. In some situations, for example in movie and television cameras continuous focus action is desired. This allows the camera to follow moving objects or to refocus on new subjects as the camera direction is changed.

Figure 4:
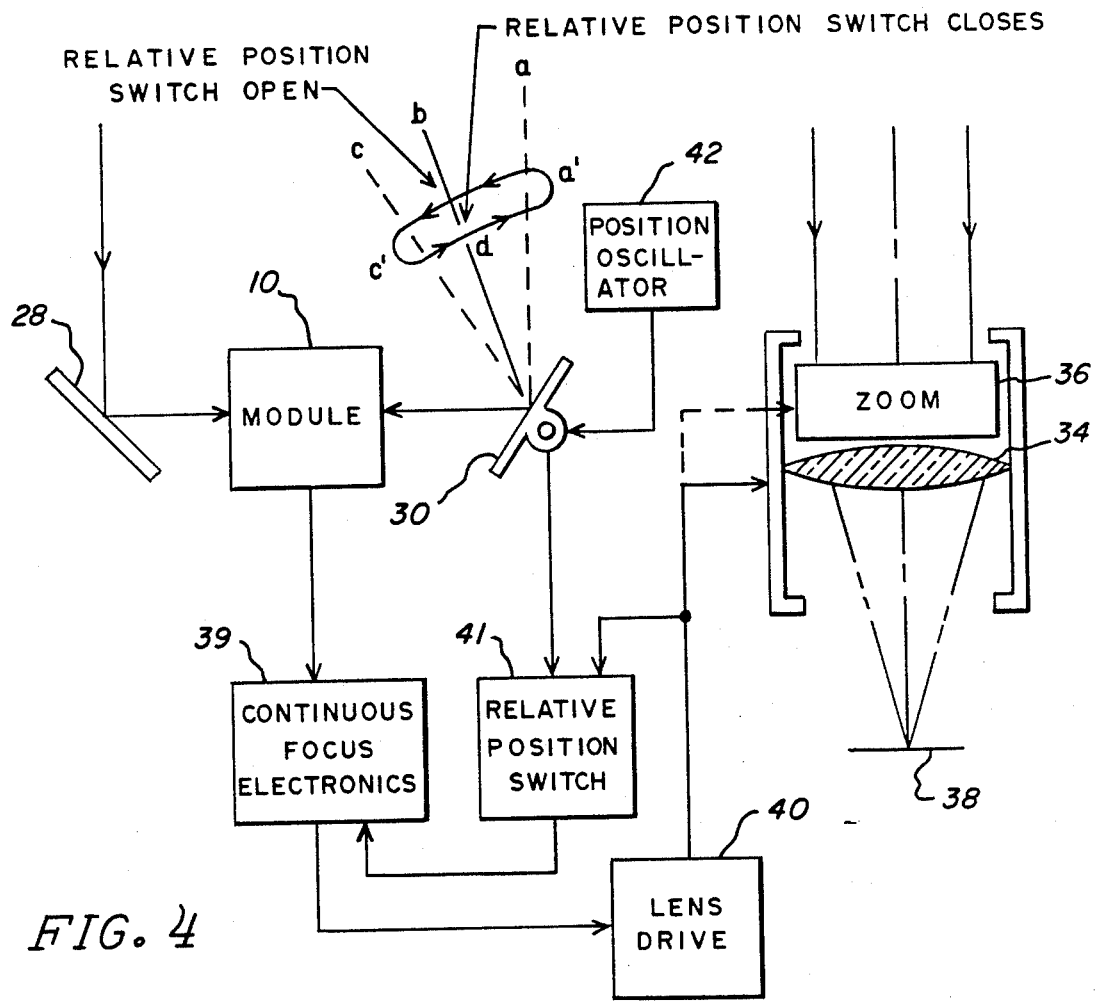
FIG. 4 shows a continuous automatic focus system.

A continuous focus system is shown in basic diagram form in FIG. 4. The system includes modules 10, mirrors 28 and 30, taking lens 34, zoom optics 36, film 38, continuous focus control electronics 39, lens drive 40, relative position switch 41, and position oscillator 42.

Scan mirror 30 is provided with a continuous oscillatory motion by position oscillator 42. This motion extends to a position $a'$ beyond infinity and to position $c'$ somewhat inside of the desired near focus distance.

The opening and closing of relative position switch 41 signals the fact that taking lens 34 and scan mirror 30 are coincidentally looking at, and focused to, the same subject distance. Switch 41 is closed when mirror 30 is in the far field with respect to the position of lens 34 and is open when mirror 30 is in the near field with respect to the position of lens 34. Relative position switch 41 is connected to continuous focus control electronics 39.

Switch 41 may take a variety of different forms, depending on the particular mechanical embodiment of lens drive 40 and position oscillator 42. Examples of relative position switches are shown in the previously mentioned Stauffer application Ser. No. 700,963. Relative position switch 41 must be able to operate for many cycles and should be capable of factory adjustment to permit system alignment.

PEAK DETECTION AND PRODUCTION OF THE OUTPUT SIGNAL

Figure 5:
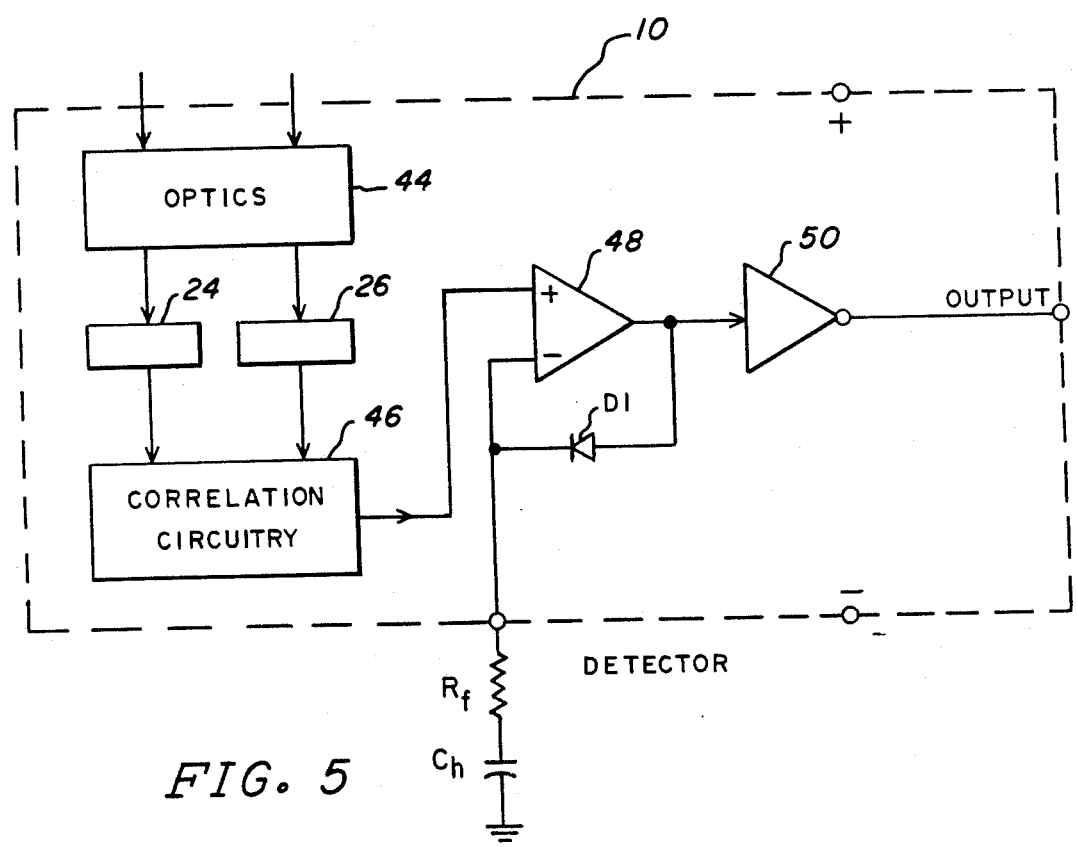
FIG. 5 shows the peak detection ciruitry associated with the module of FIG. 1.

FIG. 5 shows module 10 as it is used in preferred embodiment of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation.

Extremum sensing circuitry is provided in module 10 to process the correlation signal to determine when the major correlation extremum occurs. In the preferred embodiment shown in FIG. 5, the major extremum is a peak and the extremum sensing circuitry is peak detection circuitry. This circuitry includes differential amplifier 48, diode D1, inverter 50, filter resistor $R_f$, and hold capacitor $C_h$. In the embodiment shown in FIG. 5, resistor $R_f$ and capacitor $C_h$ are external components and are connected to the "Detector" terminal of module 10. Module 10 develops, at the terminal entitled "output" a digital positive going output signal at correlation maxima capable of operating external circuitry to stop the camera lens at the proper focus position. It is this change of state of the output signal and not the output signal level, which is indicative of the occurrence of a focus peak.

Figure 6B:
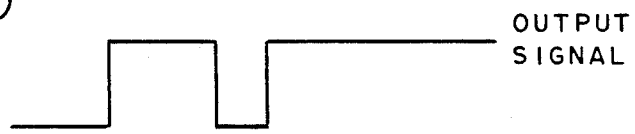
FIGS. 6a and 6b show an example of the hold capacitor voltage, correlation signal amplifier signal, and output signal produced by the module of FIGS. 1 and 5.
Figure 6A:
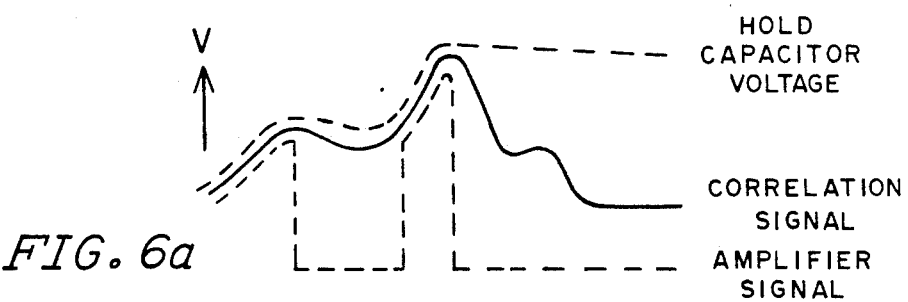

Hold capacitor $C_h$ connected to the "Detector" terminal provides a hold or comparison signal for the peak detection circuitry and to a large extent controls the sensitivity, noise rejection and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a correlation or major peak having occurred. The amplifier signal following a complex correlation waveform is shown in FIG. 6a. FIG. 6b shows the output signal from module 10 produced for the scan of FIG. 6a.

During the scan shown in FIG. 6a and 6b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply and remains in that state until the end of the scan. The last transition of the output signal from "0" to "1", therefore, represents the occurrence of the major peak.

While the peak detection circuitry must be capable of accurately following the correlation signal and determining when a peak occurs, it must at the same time be insensitive to noise on the correlation signal. Noise immunity is achieved by filter resistor $R_f$ in series with the hold capacitor $C_h$. In FIG. 6, resistor $R_f$ is external to module 10 and preferably has a value of about 300 ohms to maintain amplifier stability. Alternatively, filter resistor $R_f$ may be included in module 10. Filter resistor $R_f$ creates a lag in the hold capacitor voltage so that when the correlation signal begins to decrease, it must decrease by some finite value before the amplifier signal from amplifier 48 changes states.

CONTINUOUS FOCUS CONTROL ELECTRONICS

The last positive logic "0" to "1" transition in the output signal indicates that a correlation peak has occurred. The continuous focus control electronics uses this signal transition to develop a control signal capable of moving the camera lens to the proper focus position by operation of lens drive means.

Figure 7:
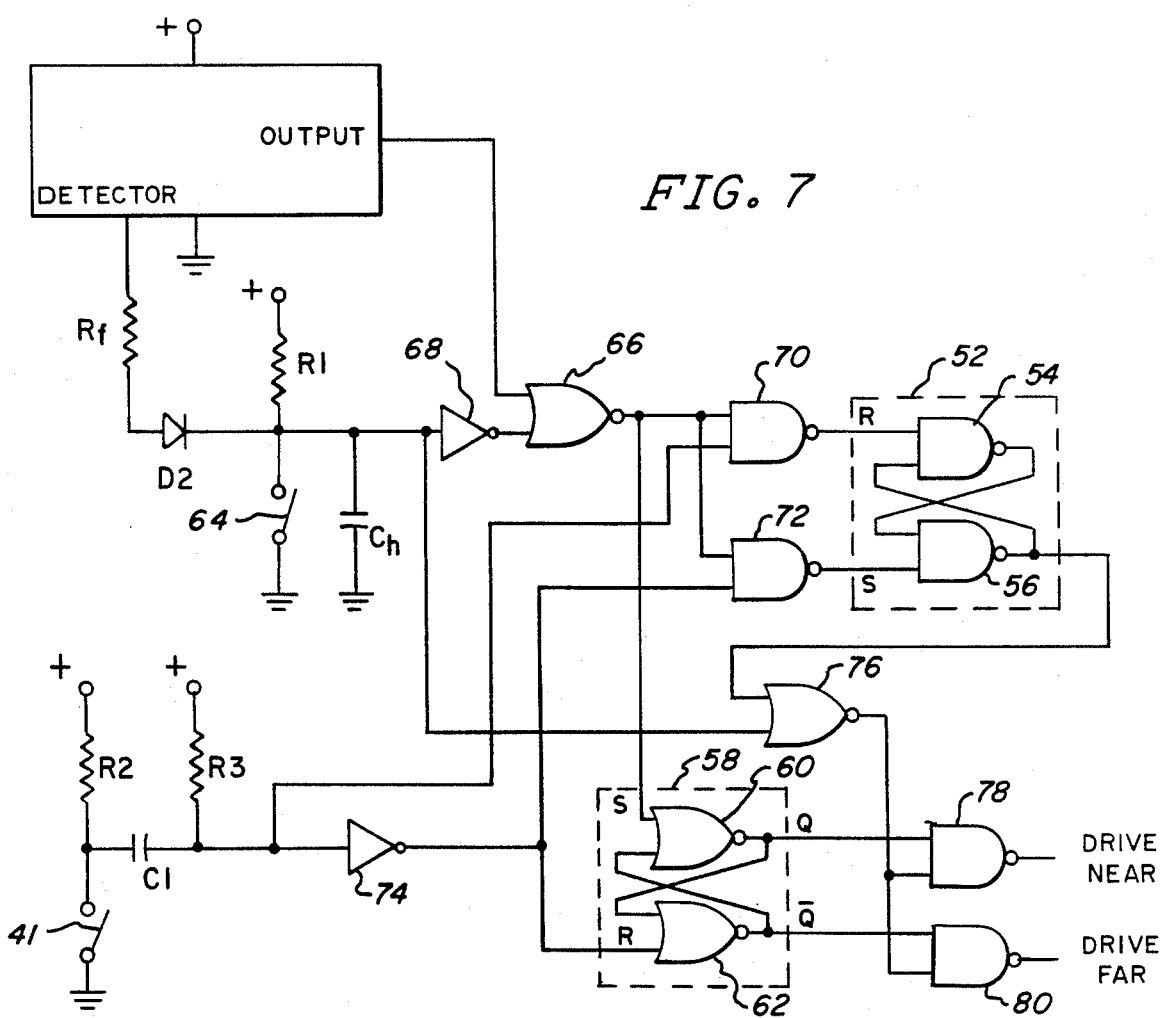
FIG. 7 is a schematic diagram of the continuous focus control electronics of the present invention.

FIG. 7 shows a schematic diagram of the preferred embodiment of the continuous focus control electronics for the continuous focus system of the present invention. The system includes a first RS flip-flop 52 formed by NAND-gates 54 and 56 and a second RS flip-flop 58 formed by NOR-gates 60 an 62. First RS flip-flop 52 provides a focus correction required signal when focus correction is required. Second RS flip-flop 58 provides focus correction direction signal indicative of the direction of required focus correction. The lens drive is controlled as a function of these signals.

The inputs to RS flip-flops 52 and 58 are derived from module 10, relative position switch 41, and sync switch 64. Relative position switch 41 indicates the positional relationship of the taking lens of the camera and the scanning mirror. In the embodiment shown in FIG. 7, switch 41 is closed when the scanning mirror is in the far field with respect to the taking lens position and is open when the scanning mirror is in the near field with respect to the lens position.

Sync switch 64 is preferably a mechanical switch connected to the scanning mirror. In the embodiment shown in FIG. 7, sync switch 64 is open during a scan of the mirror from its near limit position to the infinity position. Sync switch 64 is closed during the return scan.

The output signal of module 10 is applied to one input of NOR-gate 66. The other input to NOR-gate 66 is derived from a circuit including resistors $R_f$ and R1, diode D2, sync switch 64, hold capacitor $C_h$, and inverter 68. Resistor $R_f$ is connected to the Detector terminal of module 10. During the near to far scan, sync switch 64, which is connected in parallel with hold capacitor $C_h$, is open, thereby allowing the hold capacitor voltage to follow the correlation signal. During the return scan from far to near, sync switch 64 is closed, thereby shunting capacitor $C_h$. The voltage across hold capacitor $C_h$ is inverted by inverter 68 and applied to an input of NOR-gate 66.

The output of NOR-gate 66 is applied to input of NAND-gates 70 and 72 and to the set input of RS flip-flop 58. The other input to NAND-gate 70 is a deadband period signal, which is defined as the differentiated relative position switch 41 closure. Resistors R2 and R3 and capacitor C1 provide the deadband period signal to NAND-gate 70. The deadband period signal is also inverted 58. inverter 74 and applied to the second input of NAND-gate 72 and to the reset input of RS flip-flop 59.

The output of NAND-gate 70 is applied to the reset input of RS flip-flop 52. The set input of RS flip-flop 52 is derived from the output of NAND-gate 72.

The output of RS flip-flop 52, which is a focus correction required signal, is applied to one input of NOR-gate 76. The other input to NOR-gate 76 is derived from the signal across capacitor $C_h$.

The output of NOR-gate 76 is applied to inputs of both drive near NAND-gate 78 and drive for NAND-gate 80. The second input to drive near NAND-gate 78 is derived from the Q output of RS flip-flop 58. The Q output of RS flip-flop 58 is the second input to drive far NAND-gate 80.

The outputs of drive near NAND-gate 78 and drive far NAND-gate 80 are applied to the lens drive shown in FIG. 2. The lens drive may be a standard servo-driver, such as the Signetics NE543, or may be solenoids which actuate focus drive mechanisms.

Figure 8:
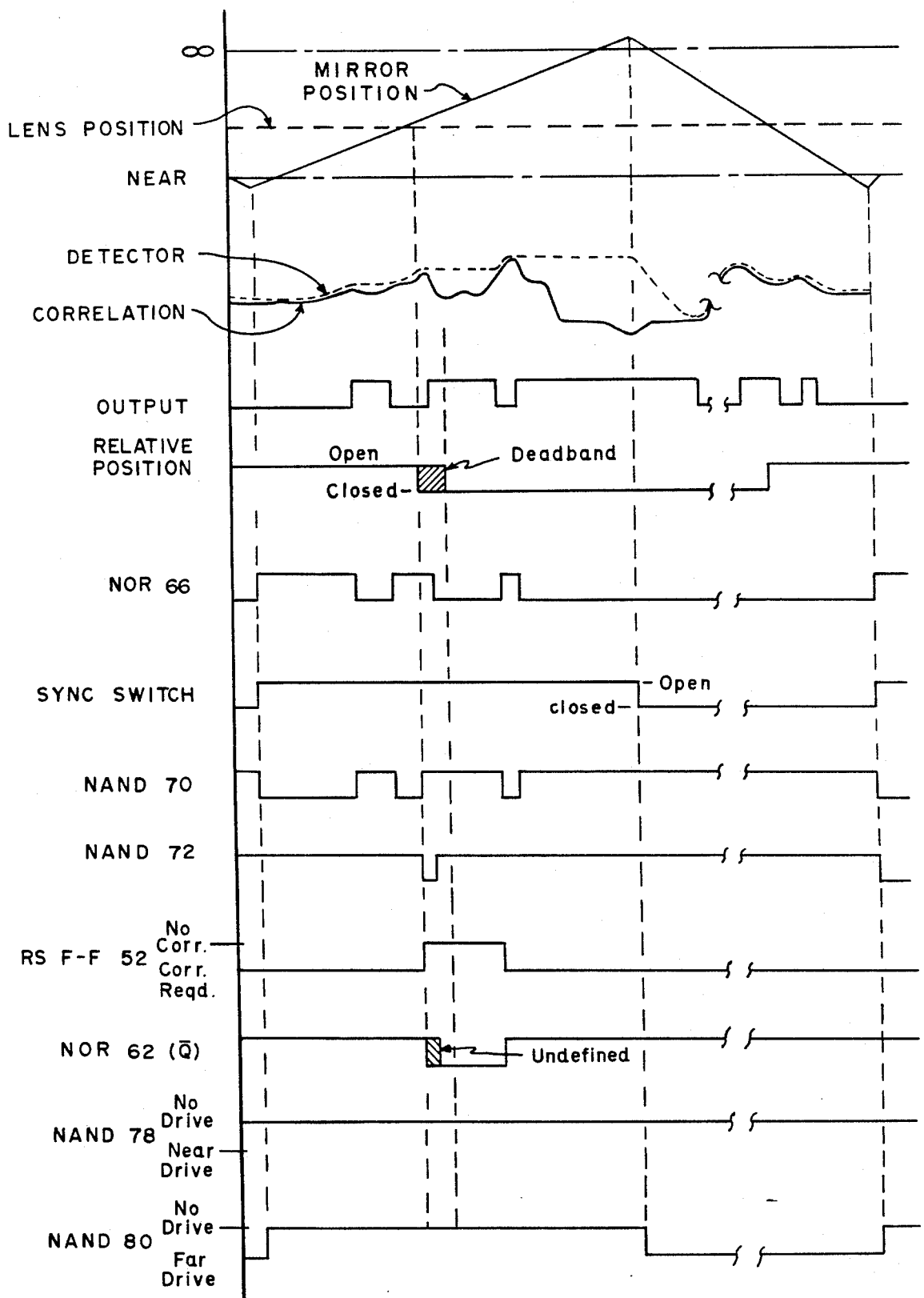
FIG. 8 shows waveforms associated with the operation of the system of FIG. 7.

The operation of the system of FIG. 7 is illustrated by the signal waveforms shown in FIG. 8. In FIG. 8, the top waveforms show the position of the lens and the scanning mirror during a complete scanning cycle. The mirror scans from its near limit position to its far limit, or infinity, position during a first part of the cycle. A return scan of the mirror from far to near completes the cycle. In the system of the present invention, only the events occurring during the scan from near to far are used to determine the positioning of the lens.

The correlation signal and the signal at the detector terminal of module 10 are also shown in FIG. 8. During the near to far scan, the detector signal follows the correlation signal when a larger peak is being approached and then holds that peak value until a larger correlation signal is achieved. During the near to far scan, sync switch 64 is open, so that the detector signal is essentially the hold capacitor signal. During the return scan, however, sync switch 64 is closed, thereby shunting hold capacitor $C_h$. The detector signal, therefore, tends to follow the correlation signal through most of the return scan.

The output signal of module 10 has a logic "0" level whenever a peak is being approached. The transition from "0" to "1" indicates that the peak has been encountered. The last transition from "0" to "1" indicates the position of the major peak in the correlation signal. If the output signal is still "0" at the end of the near to far scan, it mans that the correlation signal was still rising and the correct focus position is at infinity.

Relative position switch 41 is open when the mirror position is in the near field with respect to the lens position and is closed when the mirror is in the far field position with respect to the lens position. When the lens and mirror positions correspond, the relative position switch changes state. The deadband period, which is shown in FIG. 8, is defined by the differentiated relative position switch closure.

During the first scan, the output of NOR-gate 66 is merely the inverted output signal because the output of inverter 68 is zero. During the return scan, sync switch 64 closes, which causes the output of inverter 68 to change to a "1". The output of NOR-gate 66, therefore, is "0" throughout the return scan. This prevents any changes in the output signal during the return scan from affecting the states of RS flip-flops 52 and 58.

During the near to far scan, both inputs to NAND-gate 70 will be "1" whenever the output signal of module 10 is a "0" outside of the deadband period. This causes NAND-gate 70 to provide a logic "0" reset signal to RS flip-flop 52.

Each output signal logic "0" within the deadband causes both inputs to NAND-gate 72 to be "1", thereby providing a "0" set signal to RS flip-flop 52. RS flip-flop 52, therefore, will be in a set state with an output of "1" at the time of sync switch closure if the last output signal logic "0" level occurred during the deadband period. RS flip-flop 52 will be in a reset state with a logic "0" output if the last output signal logic "0" level occurred outside of the deadband. In the example shown in FIG. 8, the output signal attains a "0" level after the deadband period and the output of RS flip-flop 52 is "0" at the time of sync switch closure.

The state of RS flip-flop 52 at sync switch closure, therefore, is a focus correction required signal. A logic "1" indicates that no correction is required, whereas a logic "0" indicates that correction is required.

The direction of desired focus correction is stored in RS flip-flop 58, which is reset by the deadband period signal from inverter 74 and is set by each module output signal logic "0" during the near to far scan. If a logic "0" output signal occurs after the deadband (indicating focus correction toward infinity) as is the case in FIG. 8, RS flip-flop 58 is "set" at the time of sync switch closure. Conversely, it will be "reset" if the last "0" output signal occurs before or during the deadband (indicating focus correction toward the near range or no focus correction required).

The Q output of RS flip flop 58 is shown in FIG. 8. Since the last peak in the correlation signal occurred after the deadband period, the RS flip flop 58 is in its set state and output Q is "1" at the time of sync switch closure. Output Q of RS flip-flop 58 (which is not shown) is the inverse of the Q output.

The states of RS flip-flops 52 and 58 are NANDed together by NAND-gates 78 and 80 to form the focus drive signals. As shown in FIGS. 7 and 8, the outputs of drive near NAND-gate 78 and drive far NAND-gate 80 require no drive when they are logic "1" and require drive when they are "0". During the near to far scan, sync switch 64 is open and the output of NOR-gate 78 is always "0" so that both NAND-gates 78 and 80 require no drive of the lens.

When sync switch 64 closes, the output of NOR-gate 78 assumes the inverse of the output of RS flip-flop 52. If RS flip-flop 52 has a "1" output indicating no correction requied, the output of NOR-gate 76 is "0" and both NAND-gate 78 and NAND-gate 80 remain with a "1" output indicating no drive required. If, on the other hand, the output of RS flip-flop 52 is a "0", which indicates that correction is required, the output of NOR-gate 76 is a "1". The output of either NAND-gate 78 or NAND-gate 80 will be "0" depending on whether output Q or output Q of RS flip-flop 58 is "1". In the example shown in FIG. 8, output Q is "1", indicating that focus correction in the far direction is required. During the return scan, therefore, the output of drive far NAND-gate 80 is "0", and drive of the lens in the far direction is provided.

Conclusion

The continuous automatic focus system of the present invention provides reliable operation with a relatively small number of components. Although the present invention has been described with reference to its series of preferred embodiments, workers skilled in the art will recognize that changes may be made in form and detail without departing from the spirit and scope of the invention.

The embodiments of the invention in which an exclusive property or right is claimed are defined as follows:

1. In an optical system including lens means and lens drive means for moving the lens means, an automatic focus system comprising:
    range sensing means for providing a time-varying output signal having first and second states, the last transition of the output signal from the first to the second states being indicative of a position of proper focus;
    deadband means for providing a deadband period determined by the position of the lens means;
    focus correction required means providing a focus correction required signal if the last output signal of the first state occurs either before or after the deadband period;
    focus correction direction means for providing a focus correction direction signal indicative of a first direction if the last output signal first state occurs after the deadband period, and indicative of a second direction if the last output signal first state occurs before the deadband period; and
    focus control means for controlling the lens drive means as a function of the focus correction required signal and the focus correction direction signal.

2. The invention of claim 1 wherein the focus correction required means comprises first RS flip-flop means.

3. The invention of claim 2 wherein the first RS flip-flop means is set when the output signal has the first state during the deadband period and is reset when the output state has the first state outside the deadband period.

4. The invention of claim 3 wherein the focus correction direction means comprises second RS flip-flop means.

5. The invention of claim 4 wherein the second RS flip-flop means is set when the output signal has the first state and is reset when the deadband period occurs.

6. The invention of claim 5 wherein the focus control means comprises NAND-gate means for NANDing the focus correction required signal and the focus correction direction signal.

7. In an optical system including lens means for providing an image of an object and lens drive means for moving the lens means, an automatic focus system comprising:

scanning means for providing a scan of the object;

correlation range sensing means for providing a correlation signal having a major extremum;

extremum sensing means for receiving the correlation signal and providing an output signal which has a first state during the scan when approaching each extremum which is more extreme than previous extrema and which changes from the first state to a second state during the scan upon the occurrence of each extremum which is more extreme than previous extrema, the last change of state of the output signal from the first to the second state being indicative of the occurrence of the major extremum;

relative position sensing means for sensing the positional relationship of the scanning means and lens means, the relative position sensing means providing an effect when the scanning means and the lens means occupy a predetermined positional relationship;

deadband means for providing a deadband period determined by the occurrence of the effect;

focus correction required means for providing a focus correction required signal if the last output signal first state occurs either before or after the deadband period;

focus correction direction means for providing a focus correction direction signal indicative of a first direction if the last output signal first state occurs after the deadband period, and indicative of a second direction if the last output signal first state occurs before the deadband period; and focus control means for controlling the lens drive means as a function of the focus correction required signal and the focus correction direction signal.

8. The invention of claim 7 wherein the focus correction required means comprises first RS flip-flop means.

9. The invention of claim 8 wherein the first RS flip-flop means is set when the output signal is in the first state during the deadband period and is reset when the output signal is in the first state outside of the deadband period.

10. The invention of claim 9 wherein the focus correction direction means comprises second RS flip-flop means.

11. The invention of claim 10 wherein the second RS flip-flop means is set when the output signal is in the first state and is reset when the deadband period occurs.

12. The invention of claim 11 wherein the focus control means comprises NAND-gate means for NANDing the focus correction required signal and the focus correction detection signal.

13. The invention of claim 7 and further comprising:
sync switch means for changing states at the end of the scan.

14. The invention of claim 13 wherein the focus correction required means and the focus correction direction means comprise first and second RS flip-flop means.

15. The invention of claim 14 wherein the focus correction required signal is derived from the state of the first RS flip-flop means when the sync switch means changes state, and wherein the focus correction detection signal is derived from the state of the second RS flip-flop means when the sync switch means changes state.

16. The invention of claim 15 wherein the sync switch means prevent change in the focus correction required signal and the focus correction direction signal during a return scan of the scanning means.

* * * * *